(12) United States Patent
Hihara

(10) Patent No.: US 6,334,194 B1
(45) Date of Patent: Dec. 25, 2001

(54) FAULT TOLERANT COMPUTER EMPLOYING DOUBLE-REDUNDANT STRUCTURE

(75) Inventor: Hiroki Hihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/187,483

(22) Filed: Nov. 6, 1998

(30) Foreign Application Priority Data

Nov. 7, 1997 (JP) .................................................. 9-306074

(51) Int. Cl.⁷ ...................................................... G06F 11/00
(52) U.S. Cl. ................................................... 714/3; 712/32
(58) Field of Search .................... 714/3, 6, 7, 8, 714/10, 11, 12, 13, 25, 30, 31, 39, 47; 712/32, 227, 235; 709/201, 203, 208

(56) References Cited

U.S. PATENT DOCUMENTS

| | | | |
|---|---|---|---|
| 4,358,823 | * 11/1982 | McDonald et al. | 364/200 |
| 4,787,041 | 11/1988 | Yount . | |
| 5,099,485 | * 3/1992 | Bruckert et al. | 371/68.3 |
| 5,345,566 | * 9/1994 | Tanji et al. | 395/325 |
| 5,367,668 | * 11/1994 | Pandolfo | 395/575 |
| 5,495,579 | * 2/1996 | Shelly et al. | 395/185.05 |
| 5,550,736 | * 8/1996 | Hay et al. | 364/424.03 |
| 5,630,045 | * 5/1997 | Krygowski et al. | 395/182.08 |
| 5,666,484 | * 9/1997 | Orimo et al. | 395/182.16 |
| 5,696,895 | * 12/1997 | Hemphill et al. | 395/182.02 |
| 5,784,547 | * 7/1998 | Dittmar et al. | 395/182.02 |
| 5,991,518 | * 11/1999 | Jardine et al. | 395/182.02 |
| 6,032,265 | * 2/2000 | Oguro et al. | 714/9 |
| 6,173,414 | * 1/2001 | Zumkehr et al. | 714/6 |

FOREIGN PATENT DOCUMENTS

| | | |
|---|---|---|
| 54-81741 | 6/1979 | (JP) . |
| 54-139446 | 10/1979 | (JP) . |
| 56-35254 | 4/1981 | (JP) . |
| 57-3148 | 1/1982 | (JP) . |
| 62-85345 | 4/1987 | (JP) . |
| 1-267701 | 10/1989 | (JP) . |
| 1-288298 | 11/1989 | (JP) . |
| 2-72445 | 3/1990 | (JP) . |
| 2-118846 | 5/1990 | (JP) . |
| 4-71037 | 3/1992 | (JP) . |
| 4-78902 | 3/1992 | (JP) . |
| 5-81056 | 4/1993 | (JP) . |
| 5-282168 | 10/1993 | (JP) . |
| 6-149605 | 5/1994 | (JP) . |
| 7-219803 | 8/1995 | (JP) . |
| 8-44637 | 2/1996 | (JP) . |

* cited by examiner

*Primary Examiner*—Nadeem Iqbal
(74) *Attorney, Agent, or Firm*—Foley & Lardner

(57) ABSTRACT

A fault tolerant computer comprising plural operation controllers is provided, which can judge and separate a damaged element by using a double-redundant structure without using a triple or greater-redundant structure. The computer comprises two judgment sections corresponding to each operation controller in the double-redundant structure, and each judgment section compares an output from the operation controller connected to the present judgment section with an output from the operation controller connected to the other judgment section, wherein one judgment section receives a signal indicating a comparison result from the other judgment section, and collates this signal and a comparison result obtained in the present judgment section with reference to additional diagnosis information so as to judge whether the output from the operation controller connected to the present judgment section is correct.

12 Claims, 4 Drawing Sheets

FAULT TOLERANT COMPUTER EMPLOYING DOUBLE-REDUNDANT STRUCTURE

BACKGROUND OF THE INVENTION

1. Field of the Invention

The present invention relates to fault tolerant computers, in particular, those comprising plural (two or more) operation controllers.

This application is based on Patent Application No. Hei 9-306074 filed in Japan, the contents of which are incorporated herein by reference.

2. Description of the Related Art

A conventional computer system as shown in FIG. 4 is known, which comprises plural operation controllers, and in which even if one of the operation controllers is damaged, operations can be restarted or continued. Such a system is called a "fault tolerant computer system" using the multiprocessor method. When one of the operation controllers as constituent of the computer system is damaged, outputs from all operation controllers are compared and the damaged controller is detected according to a majority decision system or the like. Then, the output of the detected damaged controller is masked or the damaged controller is separated from the system.

Japanese Patent Application, First Publication, No. Hei 1-288928 discloses an example of such a computer system, in which outputs from plural subsystems are collected to a single judgment circuit and these outputs from these subsystems are compared, and also with diagnostic information, a correct output is detected and output.

On the other hand, Japanese Patent Application, First Publication, No. Hei 6-149605 discloses a judging method which essentially uses distributed processing without using a single judgment circuit. The system according to this method does not use an intensive judgment circuit as used in the above system of No. Hei 1-288928, and thus is known as a fault tolerant computer system having tolerance even for a fault of a judgment circuit itself.

The above-described conventional fault tolerant computers have the following problems.

The first problem is that each operator as a constituent of the parallel processing system must have equal operation control functions and capabilities in conventional techniques, which causes an increase of the size, power consumption, and the weight of the system.

The above problem relating to the fault tolerant computer using a parallel structure is due to a situation in that outputs of plural operation controllers are compared and an operation controller having a transient or permanent fault is identified so as to output data which is regarded to be the most accurate to outside the operation controller. To realize such a circumstance, plural operation controllers for performing similar operational and control processes, that is, substantially equal operation controllers are necessary.

The second problem is that a system having at least a triplet structure is necessary for realizing real-time identification of an operation controller having a transient or permanent fault in conventional techniques. It causes an increase of the size, power consumption, and the weight of the system.

This is because regarding a structure including plural operation controllers, when one of them is damaged, at least a triplet structure is necessary for identifying the damaged operation controller. In contrast, with a doublet structure, real-time identification of a damaged operation controller is impossible when one of the operation controllers is damaged.

The third problem is that it is impossible in conventional techniques to dynamically perform switching between (i) an arrangement having plural operation controllers which are simultaneously operated and (ii) a stand-by redundant arrangement in which only one operation controller is operated and the other operation controllers are not operated at the same time.

The reason is that a judgment section or examination and diagnosis section for identifying a fault operation controller and for separating it from the system does not normally operate unless it always receives plural inputs.

The fourth problem is that it is also impossible in conventional techniques to dynamically perform switching between (i) an arrangement having plural operation controllers which become simultaneously operable so as to make these operation controllers perform the same operational control for realizing a multiplexed system, and (ii) an arrangement for distributed processing in which some operation controllers perform different control operations so as to distribute functions and by which operational control capability as a system is improved and damage at a single point destroying all functions is prevented.

The reason is also that a judgment section or examination and diagnosis section for identifying a fault operation controller and for separating it from the system does not normally operate unless it always receives plural inputs.

SUMMARY OF THE INVENTION

Regarding a fault tolerant computer comprising plural operation controllers, an object of the present invention is to make it possible to judge and separate a damaged element by using a double-redundant structure without using a triple (or greater)-redundant structure, and to decrease the number of necessary modules, the size, the weight, the power consumption of the system and to simplify the circuit and system arrangement so as to improve the properties and capabilities of the system.

Another object of the present invention is to make it possible to dynamically perform switching between the stand-by redundant arrangement and the simultaneous operation arrangement with respect to plural operation controllers.

Further another object of the present invention is to realize an arrangement which has no necessity to satisfy a condition that plural operation controllers are equal and of the same kind, and to minimize the structure for satisfying necessary reliability so as to decrease the size, the weight, and the power consumption of the system, and further to make it possible to dynamically change the arrangement and to distribute functions so as to improve reliability.

Therefore, the present invention provides a fault tolerant computer comprising plural operation controllers, wherein when one of the operation controllers is damaged, the damaged operation controller is identified and separated from the system of the fault tolerant computer, and the fault tolerant computer has a double-redundant structure including two of the operation controllers, and has diagnosis means for obtaining additional diagnosis information for identifying and separating the damaged operation controller when one of the two operation controllers is damaged.

The fault tolerant computer may further comprise two judgment sections corresponding to each operation controller in the double-redundant structure, each judgment section for comparing an output from the operation controller connected to the present judgment section with an output from the operation controller connected to the other judgment section, wherein one judgment section receives a signal indicating a comparison result from the other judgment section, and collates this signal and a comparison result obtained in the present judgment section with reference to the diagnosis information so as to judge whether the output from the operation controller connected to the present judgment section is correct.

It is possible that each operation controller outputs diagnosis information into the diagnosis means before this operation controller outputs an output, and if disagreement is detected in the collation of the judgment section, then according to the input diagnosis information, it is judged whether the output from the operation controller connected to the present judgment section is correct.

It is also possible that if disagreement is detected in the collation of the judgment section, then the output from the operation controller connected to the present judgment section is input into the diagnosis means and recalculations are performed in both operation controllers, and outputs obtained by the recalculations and the output before the recalculations are compared for judging whether the output from the operation controller connected to the present judgment section is correct.

Accordingly, the damaged operation controller having a permanent or transient fault can be real-time-identified even with the double-redundant structure and without using a triple or greater-redundant structure; thus, the size, the weight, and the power consumption of the system can be reduced.

The above diagnosis means may be constructed as a specifically minimized hardware or may have a structure similar to the operation controller or the judgment section, or may have a much more improved structure.

The fault tolerant computer may further comprise means for separating the one side of the double-redundant structure from the system of the fault tolerant computer. In this case, the computer may further comprise means for setting the power of the separated side to be off so as to make a stand-by redundant arrangement if necessary.

It is also possible that in the double-redundant structure having the two judgment sections, the fault tolerant computer may further comprise means for directly outputting an output from the operation controller connected to the present judgment section without comparing it with an output from the operation controller connected to the other judgment section. Therefore, a result of another calculation can be directly and independently output outside the system.

According to the present invention, if it is judged that the output from the operation controller connected to the present judgment section is incorrect, then the output may be output outside the system or may be blocked, and the incorrect side of the double-redundant system may be set to a stand-by mode by turning the power of the side off.

In addition, any timing is possible for performing the comparing operation in the judgment section, and any timing is also possible for outputting the output obtained from the operation controller to a bus or the like. Therefore, the operation controllers may also perform different operations from each other, and there is no necessity that the operation controllers have the same structure and function. Accordingly, each operation controller may have the most optimal construction and function, and thus the size, the weight, and the power consumption of the system can be reduced.

The following arrangements are also possible in the fault tolerant computer according to the present invention.

(1) It is switchable between an arrangement in which the plural operation controllers are simultaneously operated so as to realize a multiple-redundant structure and another arrangement in which only one of the operation controllers is operated and the other one or more operation controllers are not operated at the same time by bypassing the non-operational side.

(2) It is switchable between an arrangement in which the plural operation controllers are simultaneously operated so as to make these operation controllers perform the same operational control for realizing a multiplexed system and another arrangement for distributed processing in which some operation controllers perform different control operations so as to distribute functions.

(3) It is switchable between an arrangement in which the plural operation controllers have different functional capabilities and another arrangement in which the plural operation controllers have equal functional capabilities.

Consequently, according to the fault tolerant computer having the parallel structure, an operation controller having a permanent or transient fault can be identified by comparing a target output from each operation controller of the redundant structure, and there is no necessity that the plural operation controllers be equal with each other. In the parallel structure, dynamic switching between different arrangements is possible, and the operational control capability of the system can be improved, and damage at a single point destroying all functions can be prevented.

DESCRIPTION OF THE PREFERRED EMBODIMENTS

An embodiment according to the present invention will be explained in detail with reference to the drawings.

Figure 1:
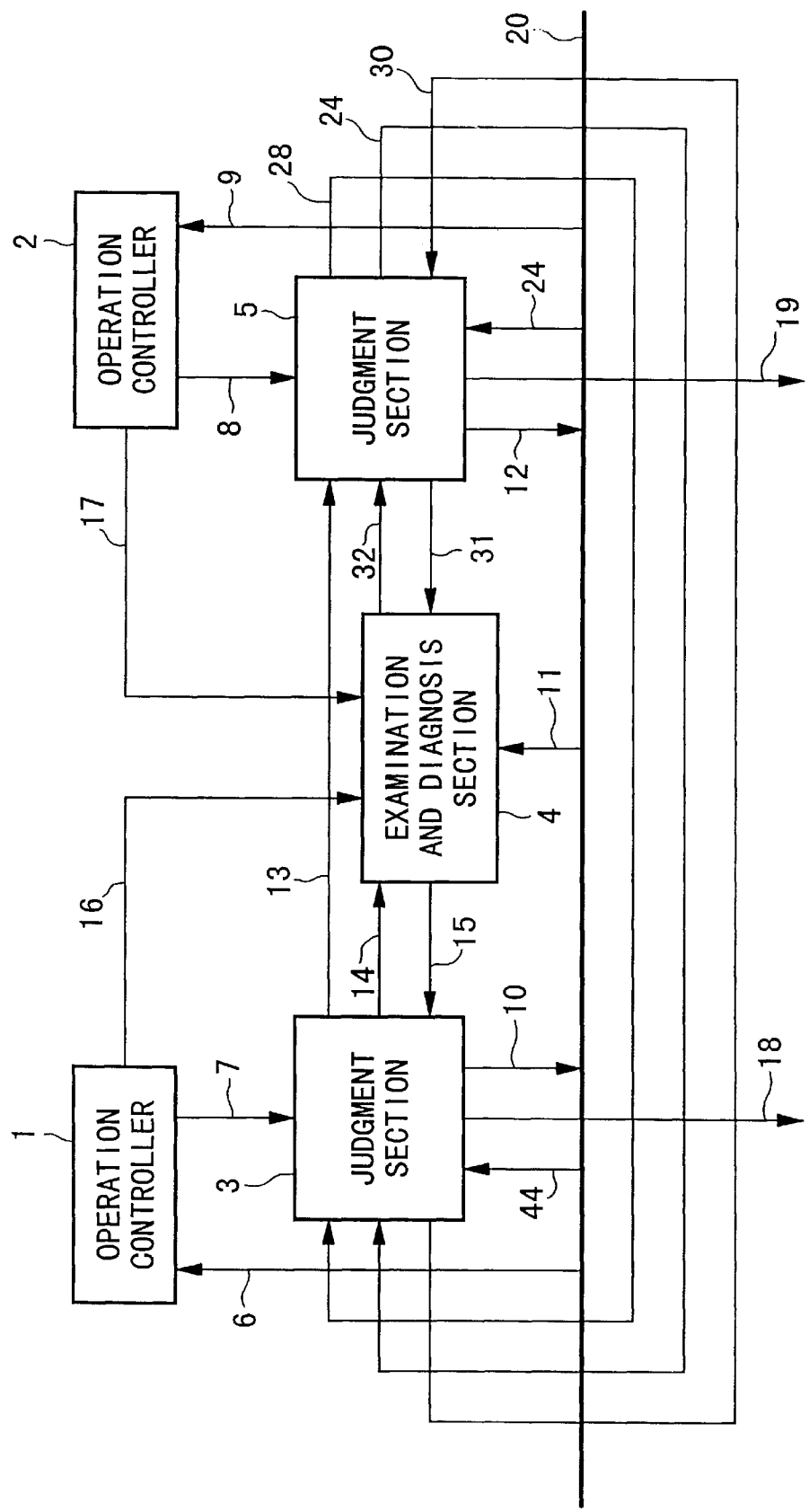
FIG. 1 is a block diagram showing the construction of a fault tolerant computer as an embodiment according to the present invention.

FIG. 1 is a block diagram showing the structure of a fault tolerant computer as an embodiment according to the present invention.

With reference to FIG. 1, it is most desirable as an embodiment of the present invention that two sets of an operating controller and a judgment section be provided. In principle, the structure having n sets of an operating controller and a judgment section is possible; however, two sets are most efficient for decreasing the size, the weight, and the power consumption.

Judgment section 5 compares an output from operation controller 2 which is connected to the present judgment section (5) with an output from another operation controller 1 via another judgment section 3, and judges whether the output from the present operation controller 2 is proper with reference to signals from the other judgment section 3 and examination and diagnosis section 4.

The judgment section 3 has a similar comparison and judgment function with respect to the other side consisting of operation controller 2 and judgment section 5.

In a case in which operation controller 1 functions as a master and an output from this controller 1 is output to bus 20, when judgment section 5 judges that the output from operation controller 1 is incorrect and the output from operation controller 2 is correct, the section 5 outputs the output of operation controller 2 to bus 20 instead of judgment section 3, and processing is continued by operating the operation controller 2 as a master.

Any timing is possible for performing the above comparing operation, and any timing is also possible for outputting the output obtained from the operation controller to the bus 20.

Only when each of the operation controllers 1 and 2 outputs data to bus 20, the comparing and judging operation is performed. Therefore, there is no necessity that operation controllers 1 and 2 always perform similar operations. That is, the operation controllers 1 and 2 may respectively perform different operations except for the operation of outputting data to bus 20, and there is also no necessity that software programs for operating these controllers are the same. In addition, there is also no necessity that the operation controllers themselves are the same and different hardware arrangements are possible.

The judgment section 5 has a function of bypassing diagnosis signals from examination and diagnosis section 4 and judgment section 3. In this case, the system is equally constructed only by operation controller 1, judgment section 3, and examination and diagnosis section 4. In addition to this function, the power of operation controller 1 can be off so as to put this controller in a stand-by state.

According to modeling of reliability, the reliability of a stand-by redundant model, in which one of the doublet sections is normally made non-operational and is operated when the presently-operational section is damaged, is higher than that of a model in which both doublet sections are always operational. That is, in the structure of the present embodiment, it is possible to dynamically switch between a simultaneously operational doublet arrangement for detecting and correcting a transient fault and a stand-by redundant arrangement for improving long-term reliability. This switching can be performed according to a target objective.

As shown in FIG. 1, the judgment section 5 has an output line 19 for directly outputting a portion of the output from operation controller 2 without comparing this portion with an output from another operation controller. In this way, in the operation without using bus 20, the operation controller 2 can perform a different operation from that performed by the operation controller 1. That is, distributed and parallel processing is possible.

Hereinbelow, operations of the present embodiment will be explained in detail with reference to FIGS. 2 and 3.

Figure 2:
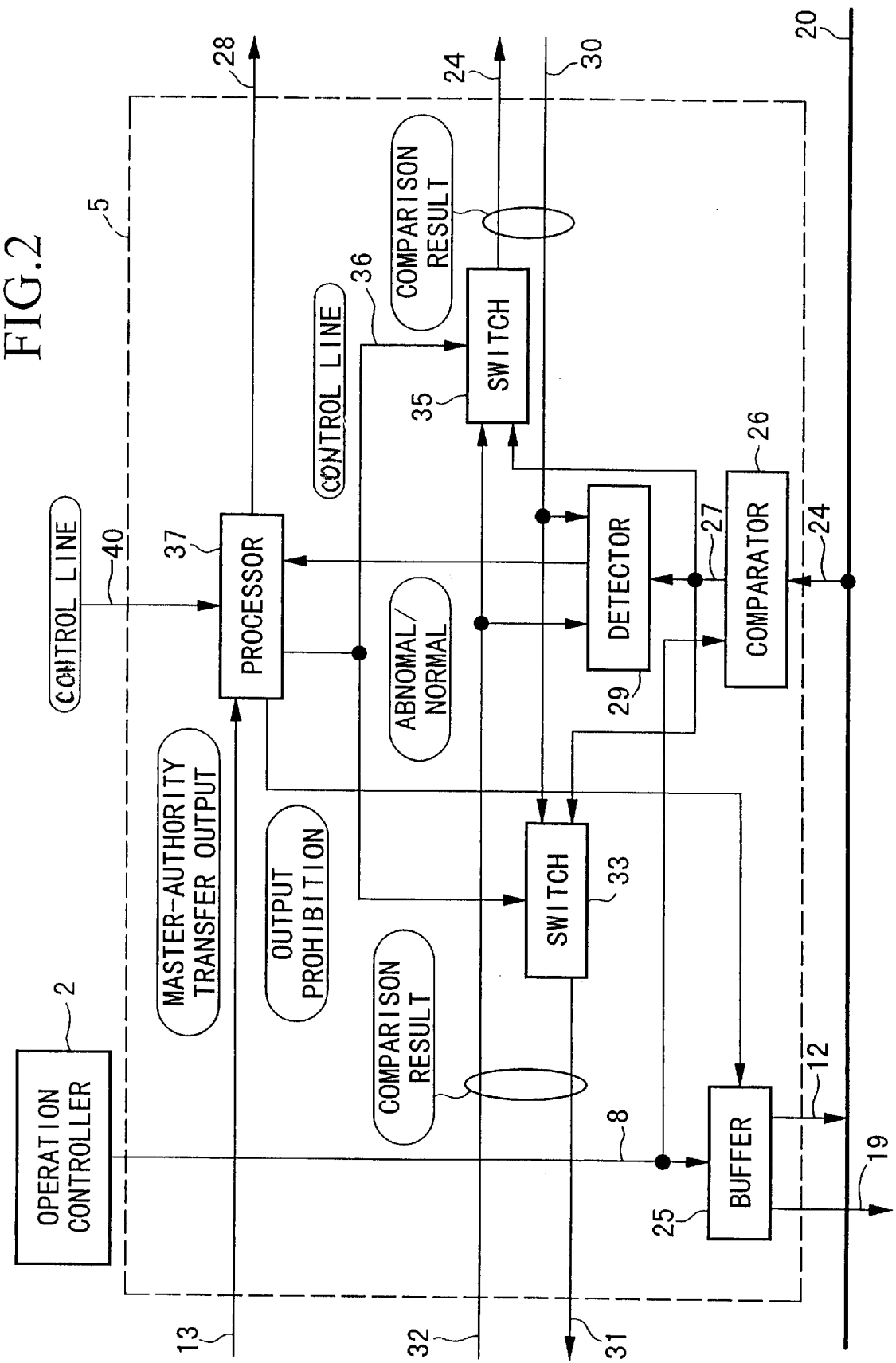
FIG. 2 is a block diagram showing the internal structure of the judgment section in the fault tolerant computer of FIG. 1.
Figure 3:
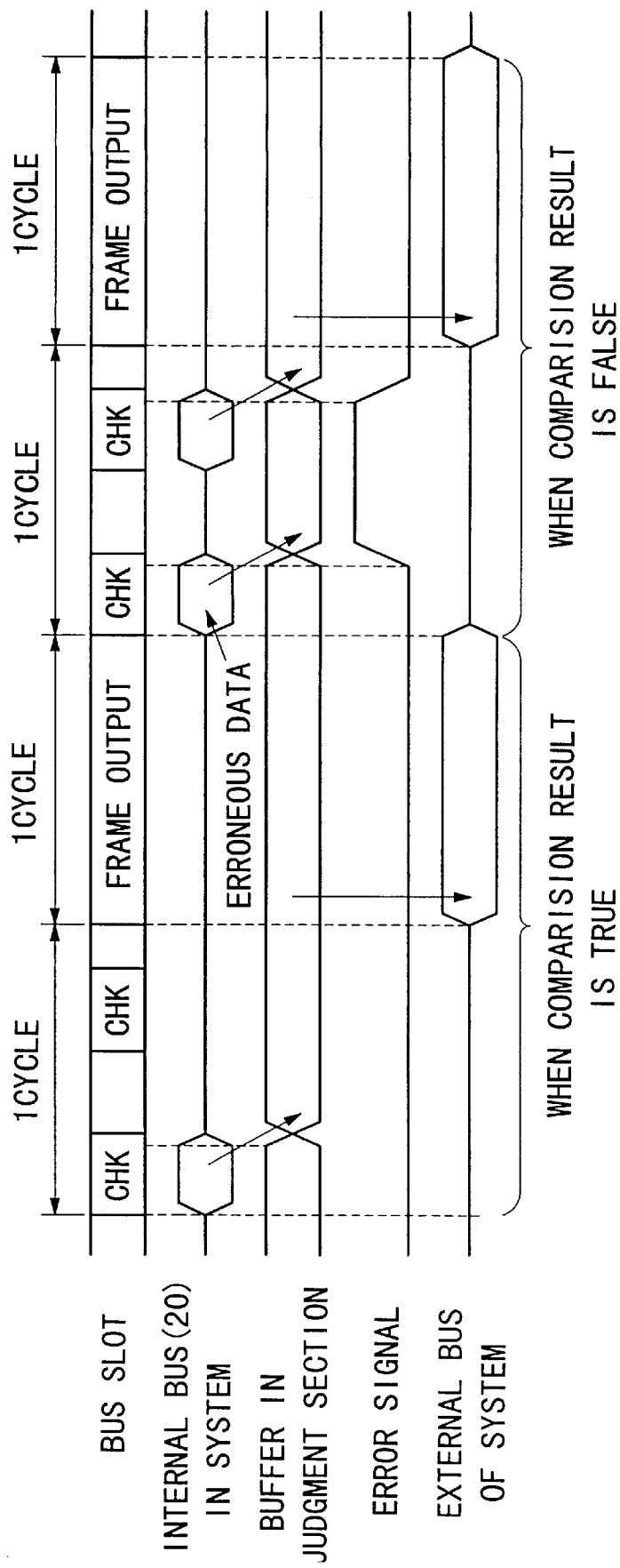
FIG. 3 is a timing chart showing the timing of the operations of the fault tolerant computer of FIG. 1.

FIG. 2 shows the internal structure of the judgment section 5 of the present fault tolerant computer. The judgment section 3 has a similar internal structure. The output from operation controller 2 is input into buffer 25. When the judgment section 5 functions as a master, relevant data is output from this buffer 25 to internal bus 20 of the system.

Figure 4:
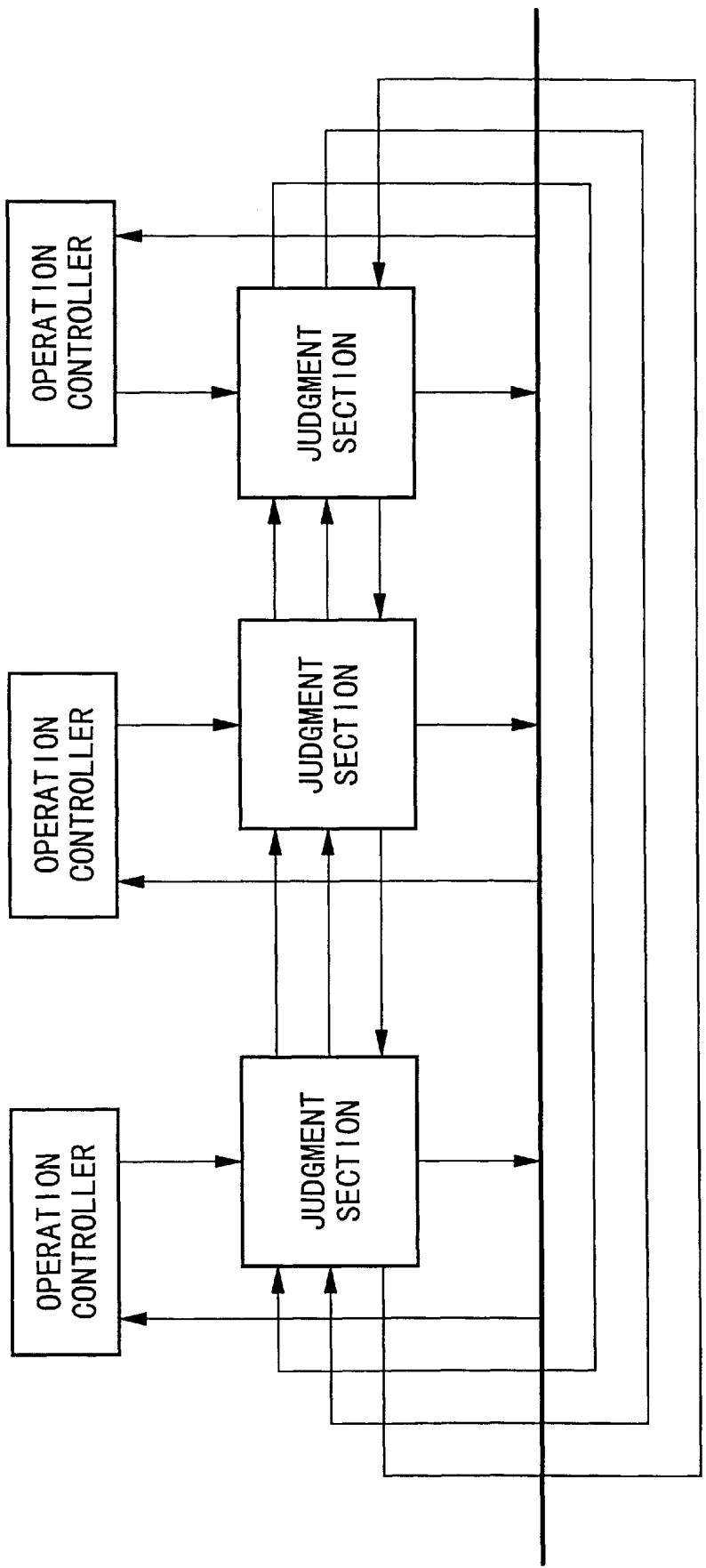
FIG. 4 is a block diagram showing the construction of a conventional fault tolerant computer.

Next, data in the bus 20 is input into comparator 26 via input line 24. In the comparator, data output from the operation controller 2 is compared with the data output from the bus 20. If both data agree with each other, data stored in the buffer 25 is output outside the system. If disagreement of data is detected by the comparator 26, then data in a buffer in the judgment section 3 at the slave side is output outside the system. These situations are shown in the timing chart in FIG. 4. This operation is based on a premise that two or more errors do not simultaneously happen in a specific period, that is, only a single error may happen in a specific period. It is known that this premise can be satisfactorily used in practical applications.

Here, the judgment section 5 receives signals from the other judgment section 3 and the examination and diagnosis section 4, via lines 32 and 30 for inputting comparison results. These signals respectively indicate true or false comparison results of judgment section 3 and examination and diagnosis section 4. The judgment section 5 collates these results and a comparison result obtained in the section 5 itself so as to judge whether the output from operation controller 2 (connected to the present judgment section 5) is correct.

In the ordinary doublet structure of the operation controller and the judgment section, when disagreement is detected in the collation, it is generally impossible to judge which side is correct. Therefore, the examination and diagnosis section supplies additional information. Various methods are possible for obtaining such additional information. Here, two representative examples will be shown.

In the first example, diagnosis information of the operation controller before an output is output from this operation controller is input into the examination and diagnosis section. If disagreement is detected in the collation of the judgment section, then according to the diagnosis information input into the examination and diagnosis section, the output from the side which is regarded abnormal is judged to be erroneous. As the diagnosis information, data indicating a memory-accessing error or data indicating a watchdog-timer overflow may be used.

In the second example for using additional information, if disagreement is detected in the above collation, then data output from the operation controller at the master side is input into the examination and diagnosis section and recalculations are performed in both operation controllers. Data obtained by the recalculations and the data of the master side which was obtained just before the recalculations, that is, three sets of data are compared for judgment.

The method of the first example is mainly used for detecting a permanent damage (called a hard error), while the method of the second example is mainly used for detecting transient damage (called a soft error). According to these methods, even in a doublet system of the operation controller and the judgment section, when damage is detected, it is possible to judge the abnormal side.

The examination and diagnosis section can be constructed using much more simpler hardware in comparison with the structures of the operation controller and the judgment section. There is no necessity that the structure of the examination and diagnosis section has a similar structure to the operation controller and the judgment section, and the system as a resource can almost equal the construction of the doublet system. Therefore, the size, the weight, and the power consumption can be reduced. However, the examination and diagnosis section may have a structure similar to those of the other operation controller and judgment section. In this case, the system arrangement almost equals the triplet structure.

On the other hand, as shown in FIG. 2, buffer 25 comprises data output line 19 which is not connected to the internal bus 20 in the system. The data output via this output line 19 is not compared with data output from the other side. Therefore, it is possible to output a result of a different operation from that performed in the other side, and thus a parallel and function-distributed arrangement is realized.

In FIG. 2, master-authority transfer output 13, comparison results 32, 31, 24, and 30 can be bypassed. For performing the bypassing operation, processor 37 including a bypass switch, and switch 33 and 35 are provided. If the above possible elements (for the bypassing operation) are all bypassed, the present operation controller and the judgment section are separated from the system. If the power of these separated parts is turned off, a stand-by redundant arrangement is realized.

Hereinbelow, typical and concrete examples according to the above explained embodiment will be shown with reference to the drawings.

With reference to FIG. 2, the present embodiment can realize a fault tolerant computer whose structure can be dynamically changed. A typical concrete example is a computer system mounted in an artificial satellite, used for data processing or attitude and orbit control. Such a computer system is operated in space where no maintenance can be performed; thus, high reliability is necessary.

Here, two types of reliability should be considered. One is static reliability based on calculations for reducing the average length of time of failures, or the like, and the other is reliability for coping with transient damage which happens with certainty at a specific time and according to a specific operation. For better reliability, in the above-described doublet system, a stand-by redundant arrangement is chosen in the normal state, and before a critical event happens, both sides are made operational.

Next, typical operations relating the present embodiment of the present invention will be explained with reference to FIG. 2.

Typically, one side (of the doublet structure) is operational and the power of the other side is set to be off so as to realize a stand-by redundant arrangement. In this way, static reliability of the system can be improved. However, static reliability is insufficient for coping with transient damage, as described above. For example, regarding a computer system mounted in a space satellite, when attitude control is performed for putting the satellite into an orbit, an accurate operation must be performed at a specific time. In such a case, static reliability is insufficient and both sides in the system should be made operational so as to compare both sides.

Such a switching arrangement can be realized in the judgment section in FIG. 1 by switching the on-off states of each signal line (refer to FIG. 2) for operating the bypassing function.

If observation data or the like is processed, general operational capability of the computer system can be improved by operating both sides and simultaneously by distributing functions using parallel processing.

As a variation of the embodiment of the present invention, in the structure as shown in FIG. 1, different CPUs can be used for each operation controller and for each judgment section. In this case, regarding important data, outputs from both sides are compared with each other, and other data are distributed to each side according to the operational capabilities of the side.

What is claimed is:

1. A fault tolerant computer comprising plural operations controllers, wherein when one of the operation controllers is damaged, the damaged operation controller is identified and separated from the system of the fault tolerant computer, and the fault tolerant computer has a double-redundant structure including two of the operation controllers, and the double-redundant structure has:

a diagnosis section, connected to both the operation controllers, for obtaining from each operation controller additional diagnosis information for identifying and separating the damaged operation controller when one of the two operation controllers is damaged; and two judgment sections connected to each operation controller and connected to each other, each judgment section for comparing an output from the operation controller connected to the present judgment section with an output from the operation controller connected to the other judgment section, and receiving a signal indicating a result of the comparison from the other judgment section, and collating this signal and a result of the comparison obtained in the present section with reference to the diagnosis information so as to judge whether the output from the operation controller connected to the present judgment section is correct.

2. A fault tolerant computer as claimed in claim 1, wherein each operation controller outputs diagnosis information into the diagnosis section before this operation controller outputs an output, and if disagreement is detected in the collation of the judgment section, then according to the input diagnosis information, it is judged whether the output from the operation controller connected to the present judgment section is correct.

3. A fault tolerant computer as claimed in claim 1, wherein if disagreement is detected in the collation of the judgment section, then the output from the operation controller connected to the present judgment section is input into the diagnosis section and recalculations are performed in both operation controllers, and outputs obtained by the recalculations and the output before the recalculations are compared for judging whether the output from the operation controller connected to the present judgment section is correct.

4. A fault tolerant computer as claimed in claim 1, further comprising means for separating the one side of the double-redundant structure from the system of the fault tolerant computer.

5. A fault tolerant computer as claimed in claim 4, further comprising means for setting power of the separated side to be off so as to make a stand-by redundant arrangement.

6. A fault tolerant computer as claimed in claim 1, further comprising means for directly outputting an output from the operation controller connected to the present judgment section without comparing it with an output from the operation controller connected to the other judgment section.

7. A fault tolerant computer as claimed in claim 1, wherein it is switchable between an arrangement in which the plural operation controllers are simultaneously operated so as to realize a multiple-redundant structure and another arrangement in which only one of the operation controllers is operated and another one or more operation controllers are not operated at the same time by bypassing the non-operational side.

8. A fault tolerant computer as claimed in claim 1, wherein it is switchable between an arrangement in which the plural operation controllers are simultaneously operated so as to make these operation controllers perform the same operational control for realizing a multiplexed system and another arrangement for distributed processing in which some operation controllers perform different control operations so as to distribute functions.

9. A fault tolerant computer as claimed in claim 1, wherein it is switchable between an arrangement in which the plural operation controllers have different functional capabilities and another arrangement in which the plural operation controllers have equal functional capabilities.

10. A fault tolerant computer comprising plural operation controllers, wherein when one of the operation controllers is damaged, the damaged operation controller is identified and separated from the system of the fault tolerant computer, and the fault tolerant computer has a double-redundant structure including two of the operation controllers, a diagnostic unit to obtain additional diagnosis information for identifying and separating the damaged operation controller when one of the two operation controllers is damaged, and a switch arranged to separate the one side of the double-redundant structure from the system of the fault tolerant computer.

11. A fault tolerant computer as claimed in claim 10, further comprising a power switching unit arranged to set power of the separated side to be off so as to make a stand-by redundant arrangement.

12. A fault tolerant computer as claimed in claim 10, further comprising a direct output unit to directly output an output from the operation controller connected to the present judgment section without comparing it with an output from the operation controller connected to the other judgment section.

* * * * *